United States Patent [19]

Uchiyama

[11] Patent Number: 5,228,060
[45] Date of Patent: Jul. 13, 1993

[54] CONTROL UNIT FOR CONTROLLING MODEM USED IN RECEIVER

[75] Inventor: Hiroki Uchiyama, Yokohama, Japan

[73] Assignee: Ricoh Company, Ltd., Tokyo, Japan

[21] Appl. No.: 736,926

[22] Filed: Jul. 29, 1991

[30] Foreign Application Priority Data

| Jul. 31, 1990 | [JP] | Japan | 2-202918 |
| Sep. 27, 1990 | [JP] | Japan | 2-260244 |
| Feb. 18, 1991 | [JP] | Japan | 3-45852 |

[51] Int. Cl.$^5$ .......................................... H04B 3/46
[52] U.S. Cl. ..................................... 375/75; 375/10; 375/108
[58] Field of Search ............... 375/7, 8, 10, 38, 40, 375/75, 11, 12, 13, 108; 370/17; 178/67; 379/93

[56] References Cited

U.S. PATENT DOCUMENTS

| 4,037,049 | 7/1977 | Lyon | 375/8 |
| 4,477,895 | 10/1984 | Casper et al. | 375/40 |
| 4,514,855 | 4/1985 | Lang et al. | 375/118 |
| 4,864,557 | 9/1989 | Morton et al. | 370/17 |

FOREIGN PATENT DOCUMENTS

1279617 11/1989 Japan .

*Primary Examiner*—Stephen Chin
*Attorney, Agent, or Firm*—Oblon, Spivak, McClelland, Maier & Neustadt

[57] ABSTRACT

A control unit for controlling a modem used in a receiver demodulates a received signal by use of an adaptive equalizer, and a recovery circuit includes a timing recovery function and a carrier recovery function. States regarding operations in the adaptive equalizer and the recovery circuit are updated based on the received signal. The modem includes a determination unit for determining whether or not the modem is operating unusually based on a signal processed in the modem, a buffer for storing state data at a predetermined timing when the determination unit determines that the modem is not operating unusually, and a controller for controlling the adaptive equalizer and the recovery circuit so that the adaptive equalizer and the recovery circuit operate based on the state data which has been stored in the buffer when the determination unit determines that the modem is operating unusually.

15 Claims, 9 Drawing Sheets

CONTROL UNIT FOR CONTROLLING MODEM USED IN RECEIVER

BACKGROUND OF THE INVENTION

The present invention generally relates to a control unit for controlling a modem, more particularly to a modem which is used for a mobile communication system such as facsimiles used in vehicles, and has an equalizing function, a timing recovery function and a carrier recovery function.

In general, a modem in a receiver demodulates a received signal, which has been modulated in accordance with a PSK (Phase Shift Keying), a DPSK (Differential Phase Shift Keying) or the like, so as to reproduce transmitted data. In a case where the modem demodulates the received signal, a transmission characteristic which affects the transmitted signal in a transmission path, a frequency offset which is the difference between a frequency of a carrier in a transmitter side and a frequency of a carrier in a receiver side, and a carrier phase jitter are respectively corrected. Then a synchronous signal is extracted from the received signal, and thus the transmitted data is reproduced from the received signal in synchronism with the synchronous signal.

The transmission characteristic is corrected by an adaptive equalizer provided in the modem. Coefficients in the adaptive equalizer are updated periodically at a predetermined symbol rate so that a characteristic of the adaptive equalizer cancels the transmission characteristic. The frequency offset and the carrier phase jitter are respectively corrected by a carrier recovery section in the modem. The carrier recovery section rotates a received signal point on a signal constellation by an amount of phase shift which is presumed to correct the frequency offset and carrier phase jitter. The synchronous signal is extracted from the received signal by a timing recovery section in the modem. In a case where the transmitted data is modulated in accordance with PSK, the timing recovery section carries out, for example, the following process so that the synchronous signal is extracted. A bandpass signal (received signal) is multiplied by the carrier and passes through a wave shaping filter so that a complex baseband signal is obtained. Then the complex baseband signal is squared. A synchronous frequency component is extracted from a signal obtained by the above square calculation by a bandpass filter, so that the synchronous signal is obtained. In general, while the received signal is being processed in a case where the synchronous signal is reproduced from the received signal, various coefficients, such as coefficients in the adaptive equalizer, are obtained. Timing information for obtaining a synchronous timing can be extracted from the received signal based on the above various coefficients, and then a sampling period in an analog to digital converter which converts the received signal into digital data can be controlled based on the timing information, so that the transmitted data is reproduced in synchronism with the timing information.

Recently, a modem provided in a mobile communication system, such as a facsimile used in a vehicle, has been examined. The mobile communication system has radio transmission paths. When disturbances are supplied via the radio transmission paths to the modem, functions in the modem can deteriorate. For example, sudden disturbances, such as a short break in the transmitted signal, an amplitude and phase hit and the like, can be generated. Due to these sudden disturbances, the modem has the following trouble. That is, the coefficients in the adaptive equalizer are controlled so as to be diverged, so that the adaptive equalizer malfunctions. In addition, an amount of phase shift which is a presumption error of an amount of phase rotation is increased, and/or the synchronous signal cannot be detected due to timing errors. In these cases, the modem malfunctions, for example, it hangs up.

A high density digital magnetic recording system, such as a DAT (Digital Audio Tape Recorder), also has a problem in that the system malfunctions due to these disturbances. In the high density digital magnetic recording system, when a frequency characteristic of an input signal greatly varies due to scratches, dust and the like, a transmission characteristic of a wave shaping equalizer in the digital magnetic recording system varies. Thus, until the transmission characteristic of the wave shaping equalizer returns to normal, a signal having a distorted wave shape is output from the wave shaping equalizer. As a result, an error rate in a reproduced signal increases. To eliminate the above problems in the digital magnetic recording system, an art disclosed in Japanese Patent Laid Open Publication No. 1-279617 has been proposed.

That is, this art relates to an automatic equalizer in which a signal used in a process for a digital recording of a PCM signal is shaped so that the distortion of the signal is decreased. This automatic equalizer includes a wave shaping equalizing circuit having a transversal type filter, a level detector which detects the level of the input signal, a setting circuit which sets coefficients in the transversal filter based on an input and an output of the wave shaping equalizing circuit, and a control circuit which controls operations in the setting circuit based on the output of the level detector. When the level detector detects that the level of the input signal has become less than a normal level, the control circuit supplies information that the level of the input signal has decreased to the setting circuit. Then the setting circuit stops updating the coefficients in the transversal type filter, so that the coefficients are maintained at predetermined values. Due to the above control operation performed in the automatic equalizer, the characteristic of the automatic equalizer can be prevented from greatly decreasing.

In addition, when the setting circuit is provided with a memory which stores a history of the coefficients in the transversal type filter, the coefficients which are maintained based on the operation of the level detector can be selected from the history stored in the memory. Hence, the coefficients can also be prevented from being set at unusual values based on delay of the detecting operation in the level detector.

However, the prior art related to the digital magnetic recording system can not be applied to the modem in the mobile communication system. That is, since the phase of the carrier in the received signal of the facsimile or the like also varies, the modem cannot be controlled by only the level detector.

SUMMARY OF THE INVENTION

Accordingly, a general object of the present invention is to provide a novel and useful control unit for a modem in which the disadvantages of the aforementioned prior art are eliminated.

A more specific object of the present invention is to provide a modem in which, even if the disturbances are added to communication paths, coefficients in an adaptive equalizer can be prevented from being diverged, so that malfunctions in which the modem hangs up or the like can be prevented from occurring.

Another object of the present invention is to provide a control unit for a modem in which a received signal can return to a steady state for a short time after the disturbances are added to the communication paths.

The above objects of the present invention are achieved by a control unit for a modem used in a receiver for demodulating a received signal by use of adaptive equalizer means for equalizing the received signal, timing recovery means for generating a synchronous signal based on the received signal, and carrier recovery means for presuming a phase of a carrier in the received signal, states regarding operations in the adaptive equalizer means, the timing recovery means, and the carrier recovery means being updated based on the received signal, the control unit comprising: determination means for determining whether or not the modem is operating unusually based on a signal processed in the modem; storage means, coupled to the determination means, for storing state data at a predetermined timing when the determination means determines that the modem is not operating unusually, the state data representing states regarding operations in the modem; and control means, coupled to the determination means and the storage means, for controlling at least one of the adaptive equalizer means, the timing recovery means and the carrier recovery means so that the at least one of the adaptive equalizer means, the timing recovery means and the carrier recovery means operate based on the state data which has been stored in the storage means when the determination means determines that the modem is operating unusually.

According to the present invention, at least one of the adaptive equalizer means, the timing recovery means and the carrier recovery means operates based on the state data, which has been stored in the storage means under a condition where the modem stably operates, when the modem unusually operates. Thus, even if the disturbances are added to communication paths, coefficients in an adaptive equalizer can be prevented from being diverged. That is, malfunctions in which the modem hangs up or the like can be prevented from occurring. Further, a received signal can return to a steady state for a short time after the disturbances are added to the communication paths.

Additional objects, features and advantages of the present invention will become apparent from the following detailed description when read in conjunction with the accompanying drawings.

DESCRIPTION OF THE PREFERRED EMBODIMENTS

A description will now be given of a first embodiment of the present invention with reference to FIGS. 1 through 6.

Figure 1:
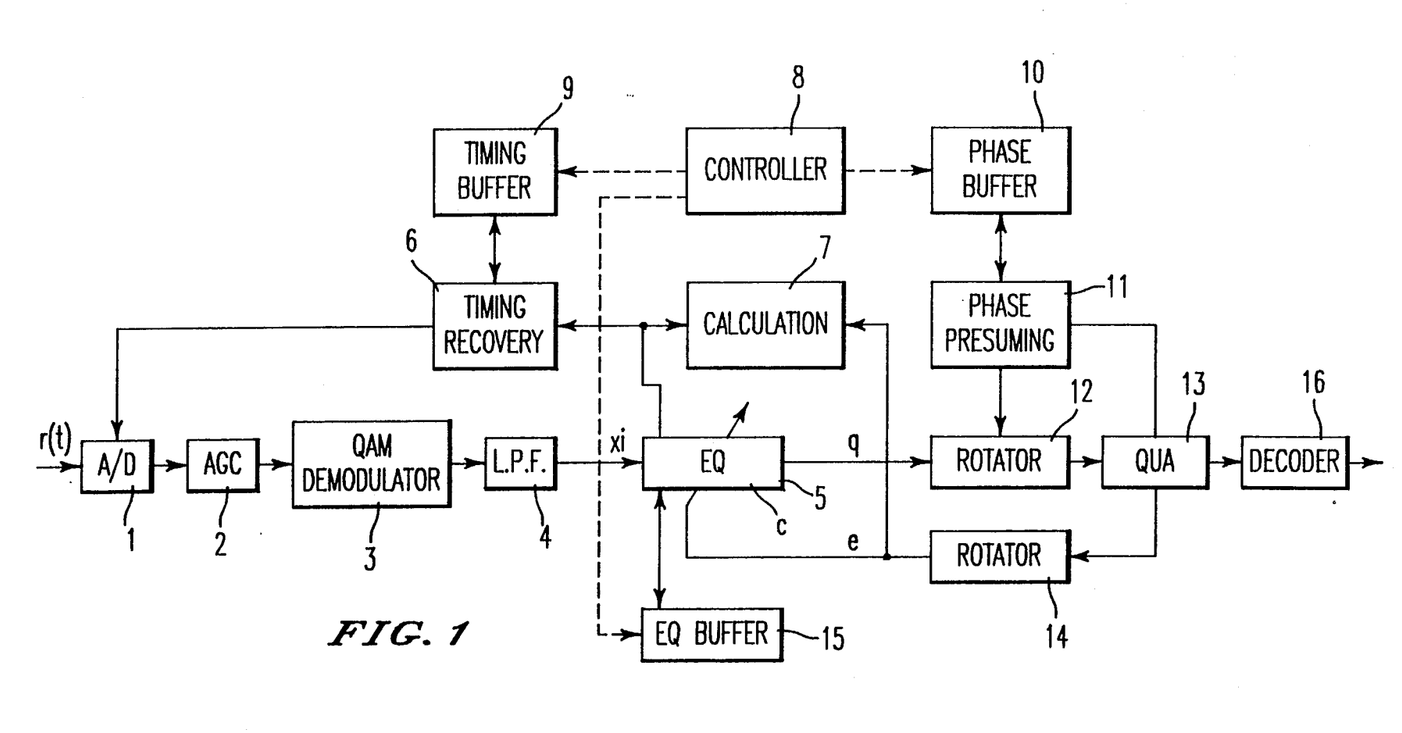
FIG. 1 is a block diagram illustrating a modem according to a first embodiment of the present invention.

FIG. 1 shows a control unit for a basic constitution of a modem according to the first embodiment of the present invention. Referring to FIG. 1, the control unit has an analog to digital converter 1, an AGC (Automatic Gain Control) circuit 2, a QAM demodulator 3, a low pass filter 4, an adaptive equalizer (EQ) 5, a timing recovery section 6, and a timing buffer 9. The analog to digital converter 1 samples a received signal r(t), modulated in accordance with a quadrature amplitude modulation process, in synchronism with a predetermined sampling signal which is a synchronous signal. The AGC circuit 2 automatically controls a gain with respect to a signal sampled by the analog to digital converter 1. The QAM demodulator 3 reproduces and demodulates a complex original baseband signal from the received signal which has been modulated in accordance with the quadrature amplitude modulation. The low pass filter 4 eliminates high frequency components from the signals demodulated by the QAM demodulator 3. The adaptive equalizer 5 corrects a transmission characteristic of the received signal so that distortion which is generated in the received signal based on a transmission characteristic in the transmission paths is eliminated from the received signal. The timing buffer 9 stores timing recovery information which is obtained by the timing recovery section 6. The timing buffer stores timing information, which is information relating to a timing signal (a synchronous signal) generated in the timing recovery section 6. The timing recovery section 6 outputs the timing signal at the timing which is presumed based on the timing information which has been stored in the timing buffer 9. Then the timing information stored in the timing buffer 9 is updated based on the above presumed timing.

The control unit also has a phase buffer 10, a phase presuming section 11, a first rotator 12, a quantizer 13, a second rotator 14, an EQ buffer 15, and a decoder 16. The quantizer 13 generates received signal points on a signal constellation and detects a phase error e at each received signal point, which phase error is a variation of the phase of the carrier at each received signal point. The phase presuming section 11 presumes an amount of rotation of each received signal point on the signal constellation based on the phase error supplied from the quantizer 13, which amount of rotation is an amount of phase shift of the carrier at each received point. The first rotator 12 corrects a signal q output from the adaptive equalizer 5 so that each received signal point is rotated on the signal constellation by the amount of phase sift which is presumed by the phase presuming section 11. As a result, the phase error of the carrier is corrected by the first rotator 12. The second rotator 14 rotates back the phase error (vector) output from the quantizer 13 by the amount of rotation obtained by the first rotator 12. A signal output from the second rotator 14 is supplied to the adaptive equalizer 5. The signal passing through the quantizer 13 is supplied to the decoder 16. Information regarding the coefficients in the adaptive equalizer 5 is stored in the EQ buffer 15. Phase information, which is information regarding the amount of phase shift which has been presumed by the phase presuming section 11, is stored in the phase buffer 10.

Further, the control unit has a calculation section 7 and a controller 8. The calculation section 7 calculates evaluation parameters based on input and output values with respect to the adaptive equalizer 5. The evaluation parameters are used for evaluating a degree that the function of the modem deteriorates. The controller 8 carries out predetermined control processes based on the evaluation parameters calculated by the calculation section 7.

The control unit shown in FIG. 1 includes the adaptive equalizer 5, the timing recovery function (the timing recovery section 6), and the carrier recovery function (the phase presuming section 11), so that the transmitted data which is modulated in accordance with the phase shift keying can be correctly reproduced from the received signal.

The adaptive equalizer 5 is formed of a transversal type FIR (Finite Impulse Response) filter. Each tap coefficient $C_i$ of the filter is updated in accordance with the following equation, $$C_i = C_i - r \cdot e \cdot CNJ[X_i] \quad (1)$$

where $X_i$ is an input of the adaptive equalizer 5, $CNJ[X_i]$ is a complex conjugate of $X_i$, e is a phase error, and r is a coefficient for adjusting a convergent speed.

When the disturbance supplied to the transmission path is included in $X_i$, each tap coefficient $C_i$ is divergently updated in accordance with the equation (1). Thus the modem, for example, malfunctions so as to hang up. In the present invention, to prevent the modem from malfunctioning, the modem has the calculation section 7, the controller 8 and the various buffers 15, 9, and 10 so that the operations of the equalizer and the like in the modem of the receiver side do not respond to the sudden disturbance supplied to the transmission path.

The calculation section 7 calculates one or a plurality of the evaluation parameters which is, for example, defined as the following E(k), Ter(k), and Cer(k).

$$E(k) = 1/L \cdot \sum_{m=0}^{L-1} e^2(k - m) \quad (2)$$

$$Ter(k) = Te(k) - Te(k - 1) \quad (3)$$

$$Te(k) = \text{Real}(C_1 \cdot C_0^*)$$

$$Cer(k) = \sum_{i=0}^{L-4} |C_k(i) - C_{k-1}(i)| \quad (4)$$

E(k) calculated in accordance with the formula (2) is a mean square value of the errors e, which are changed when the coefficients in the adaptive equalizer 5 are generated, in a short time. An unusual state generated in the amplitude of the received signal can be detected based on E(k). In the above formula (3), the evaluation parameter Ter(k) denotes a difference between coefficient ratios Te(K) and Te(k−1). Each of the coefficient ratios is a ratio of a coefficient $C_0$ corresponding to the center tap in the equalizer 4 to the coefficient $C_1$ corresponding to the next tap therein. Since Ter(k) can represent the amount of phase shift (the amount of rotation), the sudden phase shift generated by the disturbance in the transmission path can be detected based on Ter(k). In the above formula (4), the evaluation parameter Cer(K) denotes a difference between each coefficient $C_k(i)$ at a time k in the adaptive equalizer 5 and a corresponding coefficient $C_{k-1}(i)$ at a time (k−1) in the adaptive equalizer 5. In general, a difference between a vector denoted by the coefficient $C_k(i)$ at the time k and a vector denoted by the coefficient $C_{k-1}(i)$ at the time (k−1) can be used as the evaluation parameter. In formulas (2) and (4), L represents a number of taps in the adaptive equalizer 5.

The controller 8 compares each evaluation parameter and a predetermined reference value, and determines whether or not one of the evaluation parameters is unusual. The controller 8 controls the respective buffers 15, 9 and 10 based on the determining result obtained thereby. The state in the modem can be described based on any one or a combination of the coefficients in the adaptive equalizer 5, the timing information obtained by the timing recovery section 6 and the phase information obtained by the phase presuming section 11. Thus, the coefficients in the adaptive equalizer 5, the timing information and the phase information are defined as state data which describe the state in the modem. When the control 8 determines that the modem is in a steady state (the evaluation parameters are not unusual), the controller 8 stores the state data in the buffers 15, 9 and 10. On the other hand, when the controller 8 determines that one or a plurality of the evaluation parameters are unusual, the controller 8 supplies the state data from the buffer 15, 9 and 10 to the adaptive equalizer 5, the timing recovery section 6 and the phase presuming section 11.

Each of the buffers 15, 9 and 10 respectively includes a first portion and a second portion. The state data, which is obtained when a training sequence in a communication protocol is completed, is stored in the second portion of each of the buffers 15, 9 and 10. The state data, which is obtained while the communication procedure is being carried out after the training sequence, is stored in the first portion of each of the buffers 15, 9 and 10. An amount of state data stored in the first portion of each of the buffers 15, 9 and 10 corresponds to a predetermined symbol rate. The state data stored in the first portion has been obtained at a time slightly before the controller 8 determines that the evaluation parameters are unusual. The state data stored in the second portion of each of the buffers 15, 9 and 15 has been obtained at a time long before the controller 8 determines that the evaluation parameters are unusual.

Figure 2:
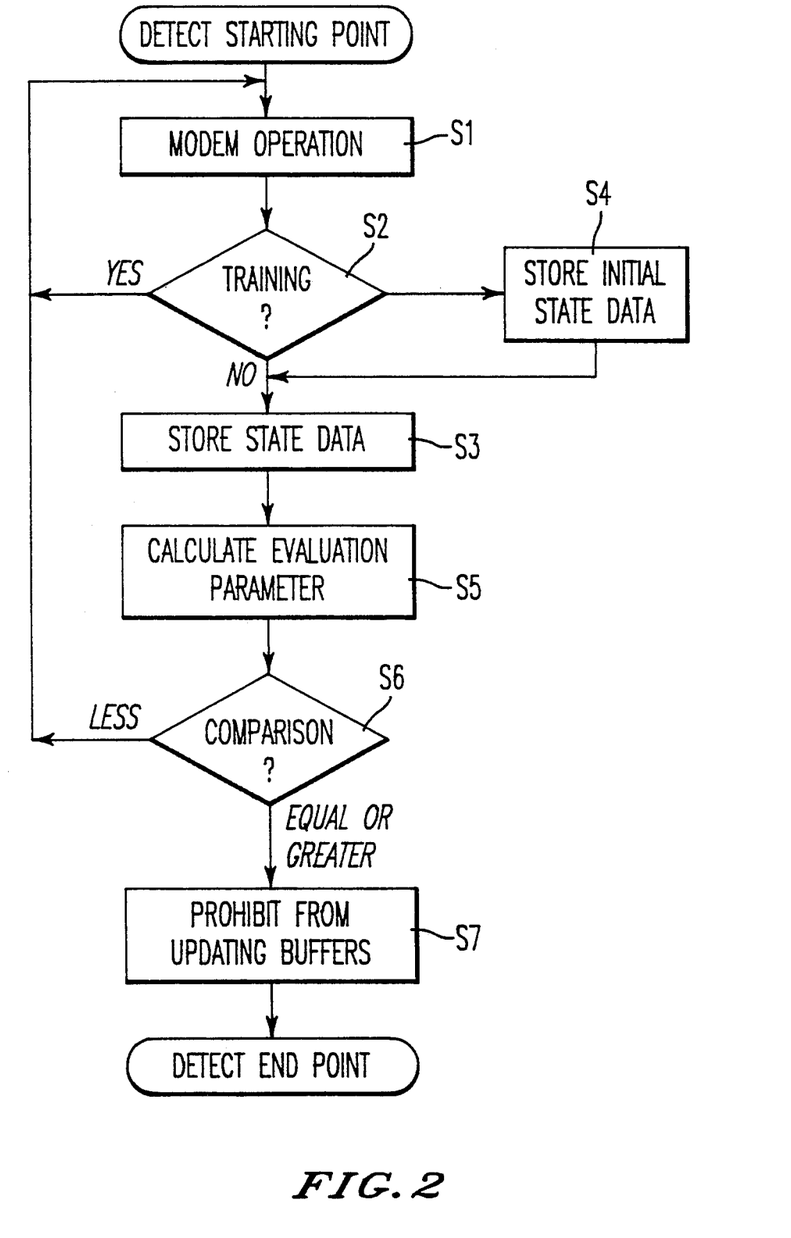
FIG. 2 is a flow chart illustrating a process for detecting a starting point of a disturbance period.
Figure 3:
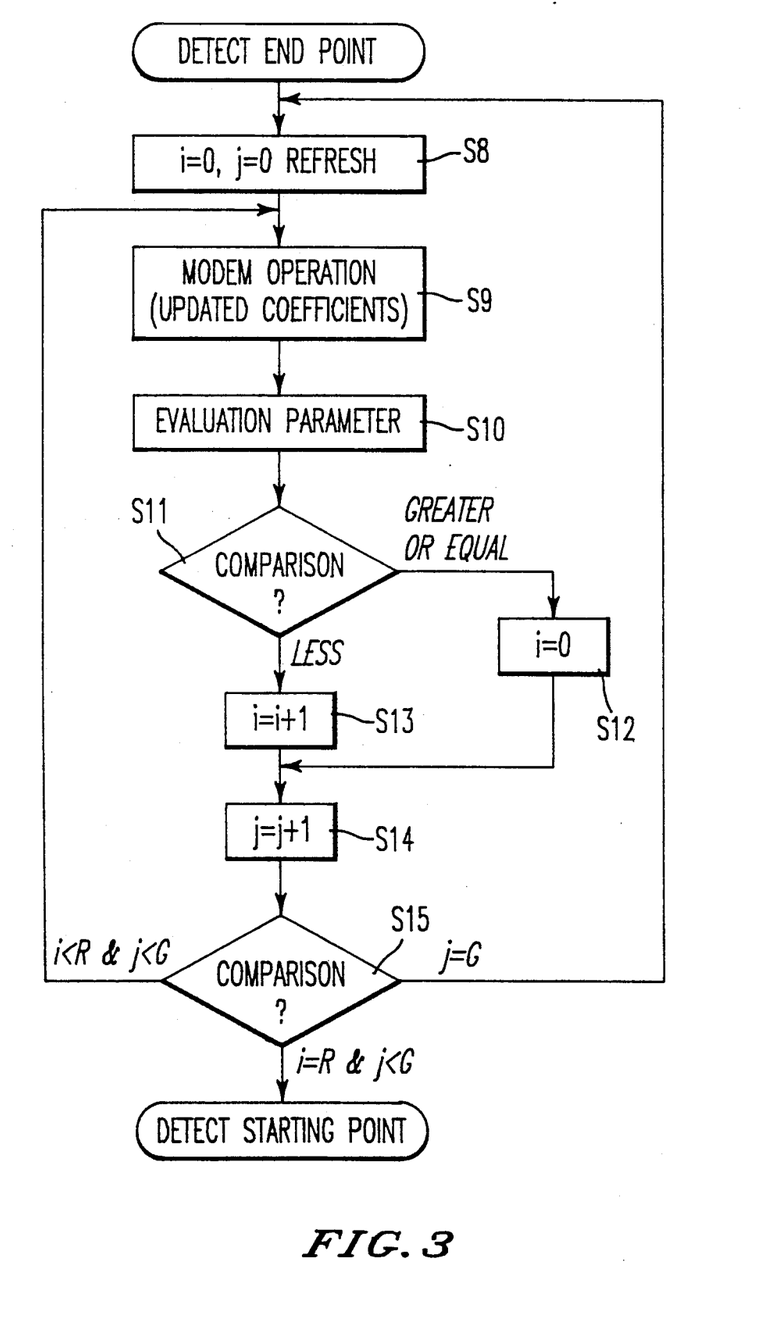
FIG. 3 is a flow chart illustrating a process for detecting an end point of the disturbance period.

The controller 8 concretely operates in accordance with flow charts shown in FIGS. 2 and 3.

The flow chart in FIG. 2 illustrates a process for detecting a starting point of a disturbance period when the disturbance is added to the communication path. The flow chart in FIG. 3 illustrates a process for detecting an end point of the disturbance period. In each of the processes shown in FIGS. 2 and 3, the evaluation parameters shown in formulas (2) and (3) are calculated.

Referring to FIG. 2, in step $S_1$, the controller 8 starts carrying out a normal process for the modem in the receiver in synchronism with a predetermined symbol rate. Step $S_2$ determines whether or not the training sequence is completed. When step $S_2$ determines that the training sequence is completed, step $S_4$ initially stores the state data indicating that the modem is in a normal state in the second portion of each of the buffers 15, 9 and 10. That is, the coefficients in the adaptive equalizer 5, the timing information and the phase information are respectively stored in the EQ buffer 15, the timing buffer 9 and the phase buffer 10 when the training sequence is completed. Then, the modem receives an image signal and demodulates the received signal. While the modem is operating, the state data stored in the buffers is updated. In the procedure for receiving the image signal, when the demodulation process is normally carried out, step $S_3$ stores the state data obtained at this time in the first portion of each of the buffers 15, 9 and 10. The amount of the state data stored in the buffers 15, 9 and 10 corresponds to a predetermined symbol rate.

The state data obtained, for example, starting from a time $t=0$ (at the present time) and ending at a time $t=-L$ (L time units in the past corresponding to a number of sample periods) are stored in the buffers 15, 9 and 10.

For example, L state data sampled during a period from the time of $t=-L$ to the time of $t=0$ (the present time) are maintained in the first portion of each of buffers 15, 9 and 10. The time corresponding to L taps of the FIR filter in the adaptive equalizer 5 is required for calculating the evaluation parameter $E(k)$ based on the L coefficients of the FIR filter in the adaptive equalizer 5. Thus, even if the coefficients in the filter are affected by the disturbance added to the communication path, at least the state data sampled at the time of $t=-L$ can be normal.

While the state data stored in the first portion of each of the buffers 15, 9 and 10 are being updated, in step $S_5$, calculation section 7 calculates the evaluation parameters $E(k)$ and $Ter(k)$ in accordance with the above formulas (2) and (3). Then step $S_6$ compares the evaluation parameters $E(k)$ and $Ter(k)$ to a first threshold value $TH_1$ and a second threshold value $TH_2$. When either the evaluation parameter $E(k)$ is greater than the first threshold value $TH_1$ or the evaluation value $Ter(k)$ is greater than the second threshold value $TH_2$, the controller 8 determines that a disturbance has been added to the communication path. That is, the starting point of the disturbance period is detected. After that, step $S_7$ prohibits the state data stored in the first portion of each of the buffers 15, 9 and 10 from being updated.

Next, the process for detecting the end point of the disturbance period starts to be carried out in accordance with the flow chart shown in FIG. 3.

Referring to FIG. 3, step $S_8$ reads out the state data, which has been sampled at the time of $t=-L$, from the buffers 15, 9, and 10. It can be presumed that the state data sampled at the time $t=-L$ is not affected by the disturbance in the communication path. The coefficients of the state data read out from the buffers are supplied to the adaptive equalizer 5. The timing information of the state data is supplied to the timing recovery section 6. The phase information of the state data is supplied to the phase presuming section 11. The above process in step $S_8$ is referred to as a refresh process (for altering the modem's action coefficients). Step $S_8$ also resets a first counter i and a second counter j at "0". After this, step $S_9$ carries out a normal modem process starting from an initial state which is obtained by the refresh process in step $S_8$. While the normal modem process is being carried out, the state data including the coefficients in the adaptive equalizer 5, the timing information in the timing recovery section 6, and the phase information in the phase presuming section 11 is updated. But the updated state data is not written in the first portion of each of the buffers 15, 9 and 10.

Then, in step $S_{10}$, the calculation section 7 calculates the evaluation parameters $E(k)$ and $Ter(k)$ in accordance with the above formulas (2) and (3) based on the input and output values with respect to the adaptive equalizer 5. Step $S_{11}$ compares the calculated evaluation parameters $E(k)$ and $Ter(k)$ with the first and second threshold values $TH_1$ and $TH_2$ in the same manner as in step $S_5$ shown in FIG. 2. Then, step $S_{11}$ determines whether or not the evaluation parameter $E(k)$ is greater than the first threshold value $TH_1$ and whether or not the evaluation value $Ter(k)$ is greater than the second threshold value $TH_2$. When step $S_{11}$ determines that either the evaluation parameter $E(k)$ is greater than the first threshold value $TH_1$ or the evaluation value $Ter(k)$ is greater than the second threshold value $TH_2$, an unusual state is detected by the controller 8. Thus, step $S_{12}$ resets the first counter i at "0". On the other hand, when the step $S_{11}$ determines that the respective evaluation parameters are less than the first and second threshold values $TH_1$ and $TH_2$, the controller 8 detects that the modem is converging onto a normal state. Thus, step $S_{13}$ increments the first counter i by +1. That is, the count value in the first counter i corresponds to a time that the modem is converged to the normal state. When either step $S_{12}$ or $S_{13}$ has been completed, step $S_{14}$ increments the second counter j by +1. That is, the count value in the second counter j corresponds to a time that the process for detecting the end point of the disturbance period is carried out.

After the second counter j is incremented by step $S_{14}$, step $S_{15}$ carries out a comparison process. In this comparison process, it is determined whether or not the count value in the second counter j is equal to a second reference value G, and whether or not the count value in the first counter i is equal to a first reference value R. In a case where step $S_{15}$ determines that the count value in the first counter i is less than the first reference value ($i<R$) and the count value in the second counter j is less than the second reference value G ($j<G$), the process from step $S_9$ through $S_{15}$ is repeatedly carried out. Then, step $S_{15}$ determines that the count value in the second counter j has become equal to the second reference value G ($j=G$) before the count value in the first counter i reaches the first reference value R, the process returns to step $S_8$. That is, in step $S_8$, the refresh process is carried out and the first and second counters i and j are reset at "0" again. Then the process is carried out in the same manner as that described above. In the refresh process, the state data which has been sampled at the time $t=-L$ and is maintained in the buffers 15, 9 and 10 are again supplied to the adaptive equalizer 5, the timing recovery section 6 and the phase presuming section 11.

Under a condition in which the above process is repeatedly being carried out, when step $S_{15}$ determines that the count value in the first counter i has reached the first reference value R before the count value in the second counter j has reached the second reference value ($i=R$ and $j<G$), the controller 8 determines that the modem has converged to the normal state. That is, at this time the controller 8 detects the end point of the disturbance period. After one disturbance period (the starting point and the end point thereof) has been detected, as has been described above, the process returns to that shown in FIG. 2 to detect the next disturbance period in which another disturbance is added to the communication path.

The first reference value R and the second reference value G are respectively set so that it can be effectively determined whether or not the modem has converged to the normal state. The first reference value R is less than the second reference value G.

In addition, after the starting point of the disturbance period is detected, it is also possible to carry out only one refresh process. In this case, the state data including the coefficients in the adaptive equalizer 5, the timing information in the timing recovery section 6, and the phase information in the phase presuming section 11 are not updated in the modem, and the evaluation values are repeatedly calculated under a condition in which the state data are maintained in the modem. Then, based on the calculated evaluation parameters, it is determined whether or not the modem has converged to the normal state.

Figure 4:
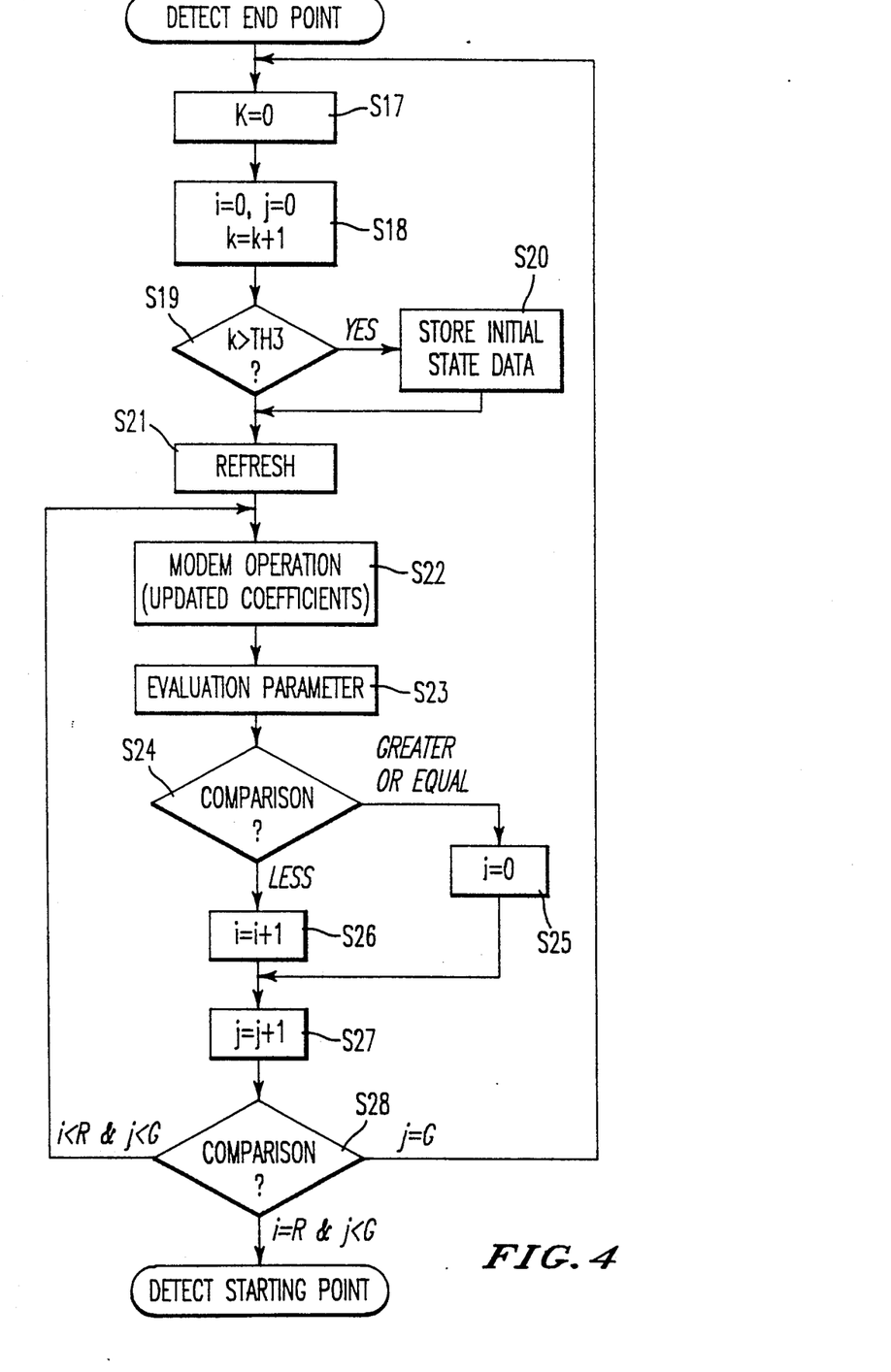
FIG. 4 is a flow chart illustrating another process for detecting an end point of the disturbance period.

The process for detecting the end point of the disturbance period can be carried out in accordance wit a flow chart shown in FIG. 4. In the process shown in FIG. 4, the second portion of each of the buffers 15, 9 and 10 is used.

Referring to FIG. 4, step $S_{17}$ resets a counter K at "0". The counter K counts a number of times that the refresh process is carried out. Then, step $S_{18}$ resets the first counter i and the second counter j at "0" and increments the counter K by +1. Step $S_{19}$ determines whether or not the count value in the counter K is greater than a third threshold value $TH_3$ ($K > TH_3$). When step $S_{19}$ determines that the count value in the counter K is greater than the third threshold value $TH_3$, step $S_{20}$ reads out the state data, which has been initially stored in the second portion of each of the buffers 15, 9 and 10, from the second portion thereof, and then step $S_{21}$ carries out the refresh process by using the state data read out by step $S_{20}$. After this, steps $S_{22}$ through $S_{28}$ are carried out in the same manner as steps $S_9$ through $S_{15}$ shown in FIG. 3. In this process, when step $S_{28}$ determines that the count value in the second counter j has reached the second reference value G, the process returns to step $S_{18}$. That is, when it is determined that the modem has not yet converged to the normal state a predetermined time after a time at which the refresh process is carried out, the process returns to an initial step.

Figure 5:
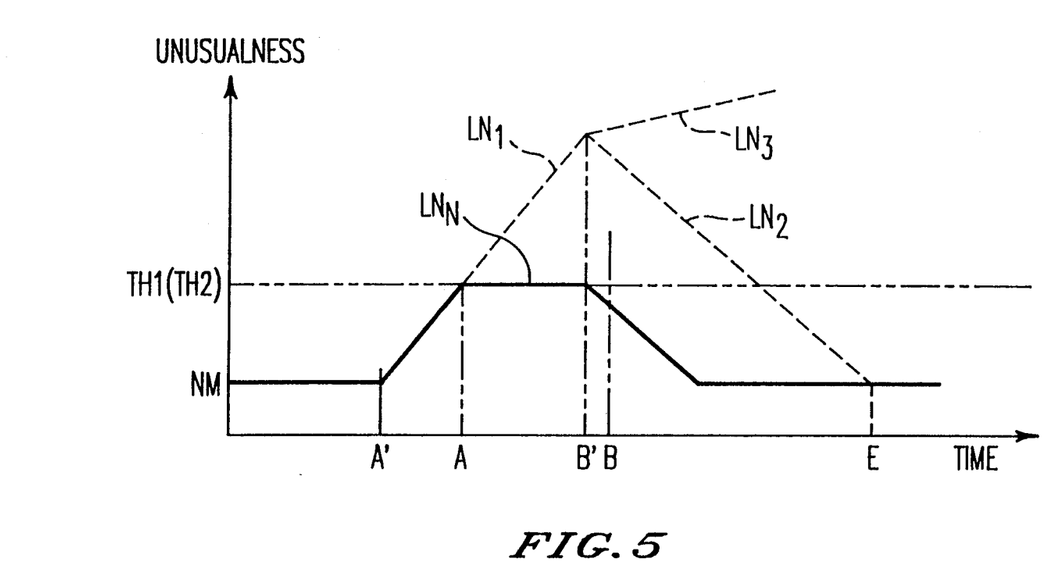
FIGS. 5 and 6 are diagrams illustrating characteristics causing the modem to diverge to an unusual state and converges to a normal state.
Figure 6:
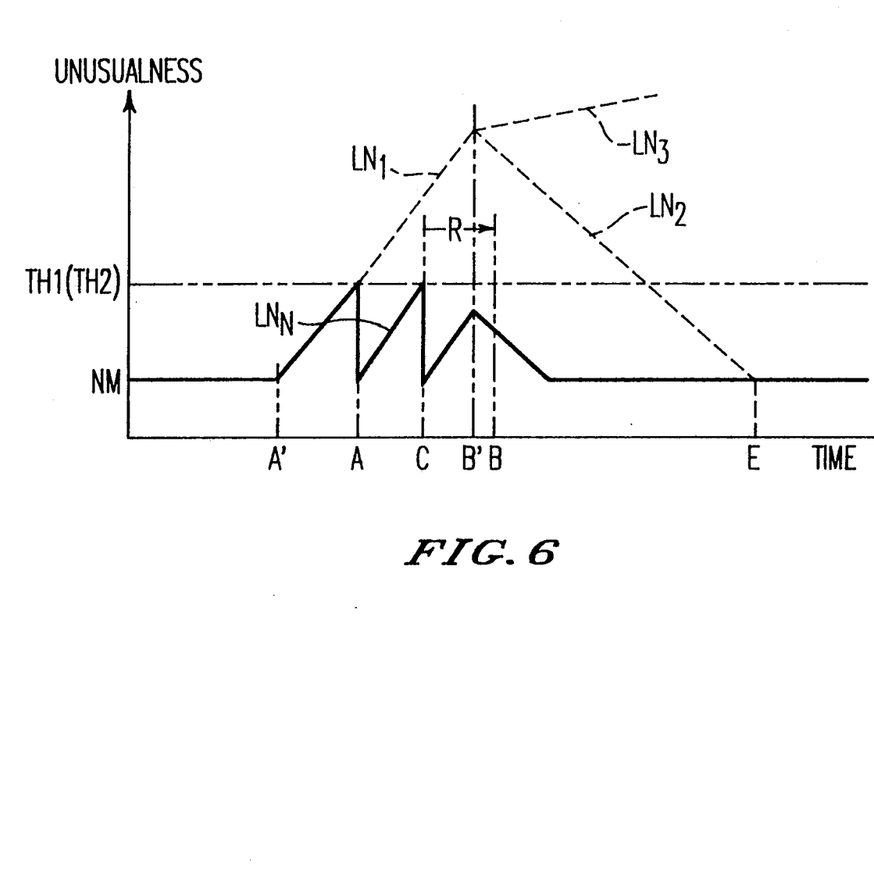

FIGS. 5 and 6 show states in which the disturbance added to the communication path affects the modem. In both FIGS. 5 and 6, the evaluation parameter representing the state of the modem varies with the elapse of time. In a case where the present invention is not applied to the modem, when the disturbance is added to the communication path, each of the evaluation parameters increases from a normal value NM corresponding to the normal state of the modem, and diverges so as to become greater than either the first threshold value $TH_1$ or the second threshold value $TH_2$ as shown by a dashed line $LN_1$ in FIGS. 5 and 6. In a case where the disturbance added to the communication path is small, each evaluation parameter converges onto the normal value NM, as shown by a dashed line $LN_2$. However, in a case where the disturbance greatly affects the modem, each evaluation parameter diverges, so that the modem malfunctions.

On the other hand, in the control unit according to the first embodiment of the present invention, since the modem demodulates the received signal by using the state data which has been sampled and stored in the buffers 15, 9 and 10 in the normal state (the refresh process), the respective evaluation parameters do not diverge so as to become greater than the first and second threshold values $TH_1$ and $TH_2$. Thus, the modem is effectively prevented from generating errors.

For example, referring to FIG. 5, the starting point of the disturbance period is detected at a time A at which one of the evaluation parameters becomes equal to either the first threshold value $TH_1$ or the second threshold value $TH_2$. At this time, the state data in the modem is reset. That is, the refresh process is carried out. Then, the modem uses the state data obtained by the refresh process, and each evaluation parameter is calculated under a condition where the state data is maintained. When the count value in the first counter i reaches the first reference value R at a time B, it is determined that the modem has converged to the normal state. Thus, the end point of the disturbance period is detected at the time B.

In this case, even if the disturbance is added to the communication path, the respective evaluation parameters do not become greater than the first and second threshold values $TH_1$ and $TH_2$ during the disturbance period A' to B'. Thus, the coefficients in the adaptive equalizer 5 do not diverge, so that the modem is prevented from hanging up.

For example, referring to FIG. 6, the starting point of the disturbance period is detected at a time A at which one of the evaluation parameters reaches either the first threshold value $TH_1$ or the second threshold value $TH_2$. At this time the refresh process is carried out. Due to the refresh process, the state data is reset in the modem. Then, the modem operates while the state data is being updated. Each evaluation parameter is calculated based on the updated state data. When one of the evaluation parameters reaches either the first threshold value $TH_1$ or the second threshold value $Th_2$ again at a time C, the refresh process is carried out again. When each evaluation parameter is less than the first and second threshold values $TH_1$ and $TH_2$ under a condition in which a predetermined time has elapsed from the time C at which the refresh process was carried out, the end point of the disturbance period is detected. That is, when the count value in the first counter i reaches the first reference value R before the count value in the second counter j reaches the second reference value G, the end point of the disturbance period is detected.

In addition, in this example shown in FIG. 6, the respective evaluation parameters do not become greater than either the first threshold value $TH_1$ or the second threshold value $TH_2$ during disturbance period A' to B'. Thus, even if the disturbance is added to the communication path, the state data does not diverge, so that the modem is prevented from hanging up.

In the modem to which the present invention is not applied, in a case where the disturbance added to the communication path is small, each evaluation parameter can converge to the normal value NM, as shown by the dashed line $LN_1$ in FIGS. 5 and 6. However, a time E at which each evaluation parameter converges to the normal value NM is greatly later from a time at which each evaluation parameter converges onto the normal value NM in the modem in accordance with the present invention. That is, according to the present invention, when the modem is affected by the disturbance added to the communication path, the modem can rapidly converge onto the normal state.

In the above first embodiment, since an unusual state in the amplitude of the received signal can be detected based on the evaluation parameter E(k) calculated by the formula (2), and a rapid phase shift generated in the received signal can also be detected by the evaluation parameter Ter(k) calculated by the formula (3), an unusual state including a phase variation which is inherent in the modem can be detected.

In the refresh process, the state data which is sampled at the time $t = -L$ and maintained in the first portion of each of the buffers 15, 9 and 10 is set in the adaptive equalizer 5 and the like. Further, in a case where the modem is not converged to the normal state by the refresh process performed based on the above state data maintained in the first portion of each of the buffers, the refresh process using the state data which is initially sampled and maintained in the second portion of each of the buffers 15, 9 and 10 is carried out. As a result, the modem can definitely converge to the normal state.

In the above first embodiment, E(k) and Ter(k) are respectively calculated in accordance with the formulas (2) and (3) as the evaluation parameters. However, Cer(k) calculated in accordance with the formula (4) can also be used as an evaluation parameter. Further, the mean of the absolute value of the phase errors in a predetermined time can also be used as an evaluation parameter.

A description will now be given of a second embodiment of the present invention with reference to FIGS. 7 and 8. In the second embodiment, the synchronous signal can be definitely detected.

Figure 7:
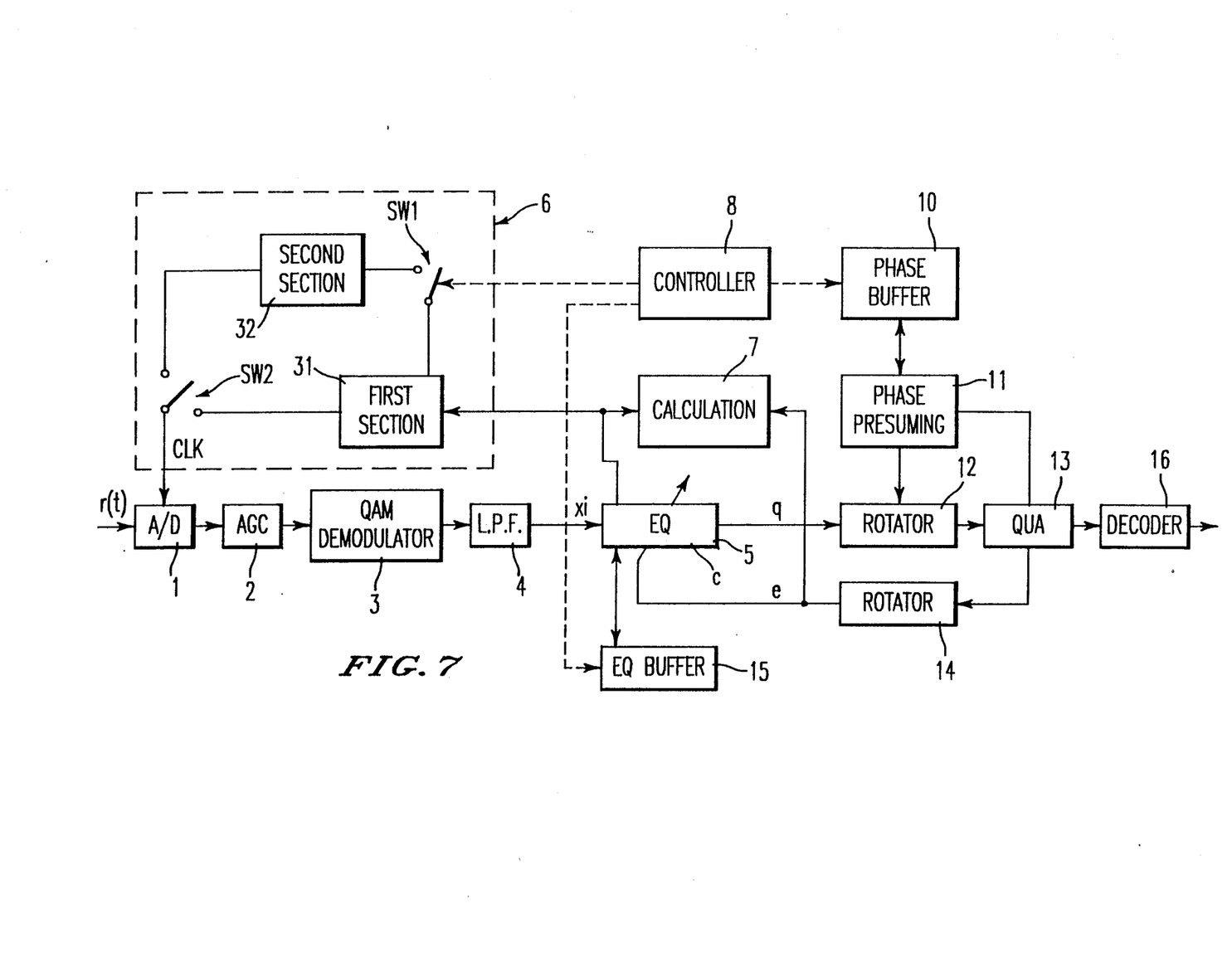
FIG. 7 is a block diagram illustrating a modem according to a second embodiment of the present invention.
Figure 8:
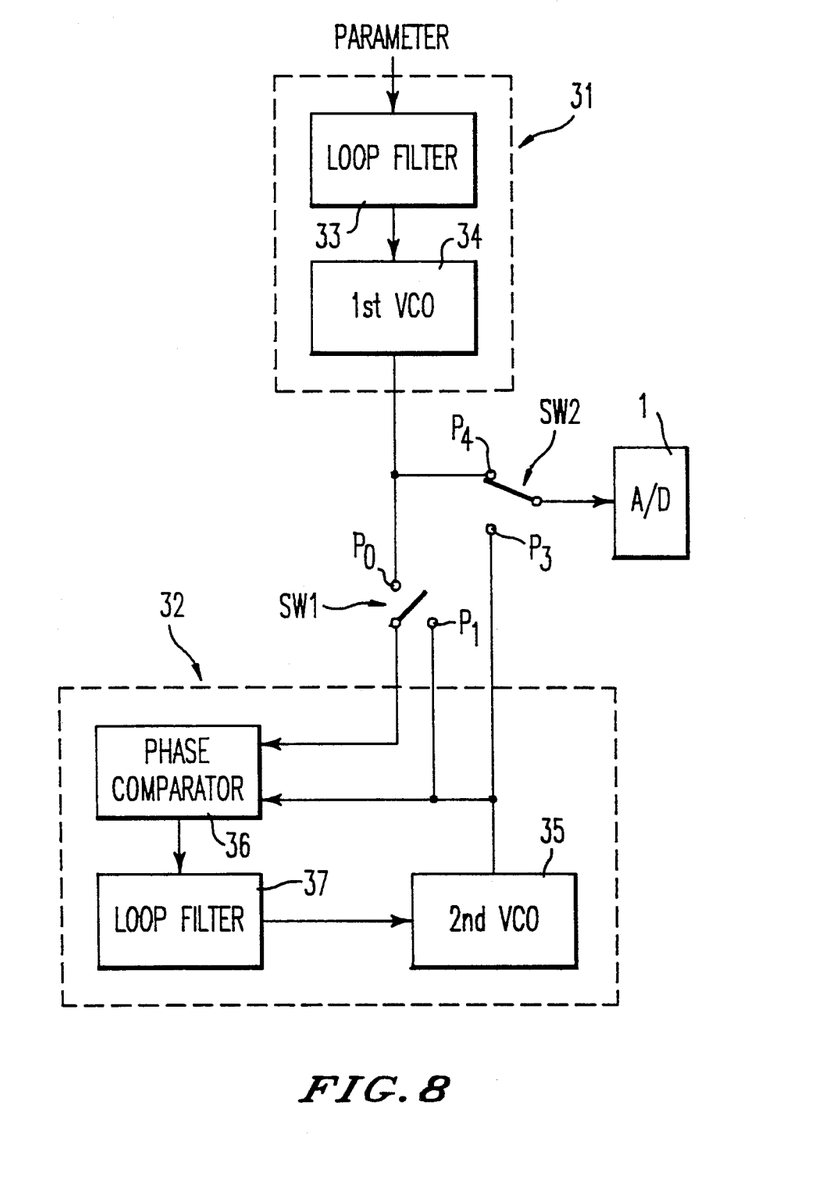
FIG. 8 is a block diagram illustrating first section and second section in a timing recovery section shown in FIG. 7.

FIG. 7 shows a basic construction of a control unit according to the second embodiment of the present invention. Those parts which are the same as those shown in FIG. 1 are given the same reference numbers as those corresponding parts in FIG. 1.

The timing information in the timing recovery section 6 does not differ so much from that initially obtained in the steady state. As a result, the modem can be formed, for example, as shown in FIG. 7.

Referring to FIG. 7, the timing recovery section 6 has a first section 31, a second section 32, a first switch $SW_1$ and a second switch $SW_2$. The first switch $SW_1$ connects either the first section 31 to the second section 32 or disconnects the first section therefrom. The second switch $SW_2$ selects a first state in which a first synchronous signal is supplied from the first section 31 to the analog to digital converter 1 or a second state in which a second synchronous signal is supplied from the second section 32 to the analog to digital converter 1. The first section 31 and the second section 32 are formed, for example, as shown in FIG. 8. Referring to FIG. 8, the first section 31 has a loop filter 33 and a first voltage control oscillator (VCO) 34. A parameter represented by a ratio ($C_1/C_0$) is supplied from the adaptive equalizer 5 to the loop filter 33. The tap coefficient $C_1$ in the adaptive equalizer 5 is divided by the tap coefficient $C_0$ of the center tap in the adaptive equalizer 5 so that the ratio ($C_1/C_0$) is obtained. The loop filter 33 eliminates noises from an input signal. The first voltage control oscillator 34 generates the first synchronous signal, which is in synchronism with the received signal, based on the parameter ($C_1/C_0$) passing through the loop filter 33.

The second section 32 has a second voltage control oscillator 35, a phase comparator 36 and a loop filter 37. The second voltage control oscillator 35 can perform a self-running oscillation at a predetermined frequency. The phase comparator 36 compares a phase of a signal output from the second voltage control oscillator 35 to a phase of the first synchronous signal. The phase comparator 36 outputs a signal corresponding to a difference between phases of two signals supplied thereto. The loop filter 37 eliminates noises and harmonic components from the signal supplied from the phase comparator 36. The second voltage control oscillator 35 operates based on the signal supplied thereto from the phase comparator 36 via the loop filter 37 so that the phase of the signal output from the second voltage control oscillator 35 becomes equal to the phase of the first synchronous signal. The first switch $SW_1$ has a first terminal $P_0$ connected to the first voltage control oscillator 34, a second terminal $P_1$ connected to a second comparison terminal of the phase comparator 36, and a common terminal connected to a first comparison terminal of the phase comparator 36. The second switch $SW_2$ has a first terminal $P_3$ connected to the second voltage control oscillator 35, a second terminal $P_4$ connected to the first voltage control oscillator 34, and a common terminal connected to the analog to digital converter 1.

In the receiver (of a facsimile set), the controller 8 controls the first switch $SW_1$ and the second switch $SW_2$ as follows.

When the training sequence starts, the first switch $SW_1$ selects the second terminal $P_1$ and the second switch $SW_2$ selects the second terminal $P_4$. Until the first synchronous signal output from the first section 31 is synchronized with the received signal, the first and the second switches $SW_1$ and $SW_2$ are maintained in the above state. When the first synchronous signal output from the first section 31 is synchronized with the received signal, the first switch $SW_1$ is switched to the first terminal $P_0$ so that the first synchronous signal is supplied from the first section 31 via the first switch $SW_1$ to the second section 32. After this, the second section 32 operates so that the signal output from the second voltage control oscillator 35 is synchronized with the first synchronous signal. That is, the second voltage control oscillator 35 varies the phase (frequency) of the second synchronous signal output therefrom so that the phase of the second synchronous signal becomes equal to that of the first synchronous signal. When the second synchronous signal output from the second section 32 is completely synchronized with the first synchronous signal, the first switch $SW_1$ is switched from the first terminal $P_0$ to the second terminal $P_1$. After the first switch $SW_1$ is switched to the second terminal $P_1$ so that the second section 32 is disconnected from the first section 31, the second voltage control oscillator 35 in the second section 32 carries out the self-running oscillation at a frequency equal to that of the first synchronous signal which was supplied from the first section 31 and synchronized with the received signal. In the above condition, the first synchronous signal is supplied from the first section 31 via the second switch $SW_2$ to the analog to digital converter 1.

When the disturbance is added to the communication path, the evaluation parameter Ter(k) calculated in the modem reaches the predetermined threshold value. Then, when the controller 8 determines errors have been generated in the first synchronous signal output from the first section 31 based on the evaluation parameters, the controller 8 controls the second switch $SW_2$ so that the second switch $SW_2$ is switched from the second terminal $P_4$ to the first terminal $P_3$. Thus, the second synchronous signal is supplied from the second voltage control oscillator 35, which is in the self-running oscillation mode, via the second switch $SW_2$ to the analog to digital converter 1. In this case, the frequency of the second synchronous signal is equal to the frequency of the first synchronous signal supplied under a condition where the modem stably operates. Since the second synchronous signal is supplied from the second section 32 to the analog to digital converter 1 under a condition in which the disturbance affects the modem, malfunction of the modem based on a synchronous error is prevented from occuring.

After that, when the end of the disturbance period is detected, the second switch $SW_2$ is switched from the first terminal $P_3$ to the second terminal $P_4$, so that the first synchronous signal is again supplied from the first section to the analog to digital converter 1 again.

In the above second embodiment, when there is no disturbance, the first synchronous signal is supplied from the first section 31 to the analog to digital converter 1. On the other hand, under a condition in which the disturbance affects the modem, the second synchronous signal output from the second voltage control oscillator 35, which is in the self-running oscillation mode, is supplied to the analog to digital converter 1. Thus, the timing recovery section 6 can be prevented from generating a malfunction caused by the disturbance. In addition, when the disturbance affects the modem, the second synchronous signal which is not affected by the disturbance can be supplied to the analog to digital converter 1 by merely switching the first and second switches $SW_1$ and $SW_2$. That is, it is not necessary for the timing recovery section 6 to presume the timing signal (synchronous signal) based on the timing information stored in the timing buffer 9, as described in the first embodiment. Thus, when the disturbance affects the modem, a recovery of the synchronous signal supplied to the analog to digital converter 1 can be rapidly carried out.

In the above second embodiment, the self-running frequency of the second voltage control oscillator 35 can slightly vary from that which is initially set depending on the period of time elapsed. To eliminate this problem, the self-running frequency of the second voltage control oscillator 35 can be updated. That is, while the modem is in a stable state, the first switch $SW_1$ is switched from the second terminal $P_1$ to the first terminal $P_0$, and then the second voltage control oscillator 35 operates so that the frequency of the second synchronous signal output therefrom becomes equal to the frequency of the first synchronous signal supplied from the first section 31. For example, each time the end of the disturbance period is detected, the first switch $SW_1$ is switched from the second terminal $P_1$ to the first terminal $P_0$ and the second switch $SW_2$ is switched from the first terminal $P_3$ to the second terminal $P_4$. As a result, when the disturbance affects the modem, the second synchronous signal, having the self-running frequency which is reset in the second voltage control oscillator 35 immediately before the disturbance, is supplied to the analog to digital converter 1.

Figure 9:
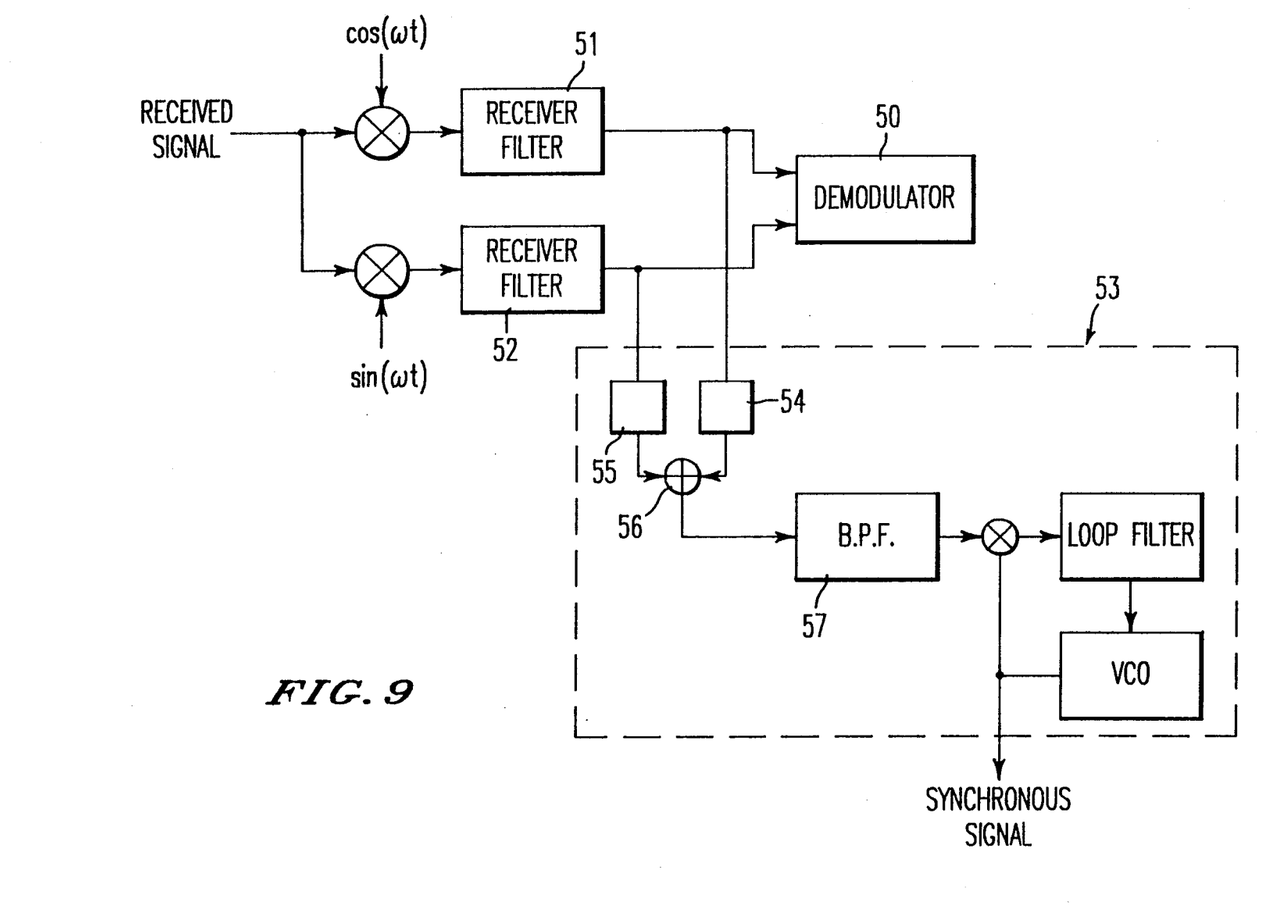
FIG. 9 is a block diagram illustrating another example of the first section in the timing recovery section shown in FIG. 7.

The above first section 31 in the timing recovery section 6 can also be formed as shown in FIG. 9.

Referring to FIG. 9, the first synchronous signal generated in a first section 53 is synchronized with the received signal in the QAM demodulator 3. The QAM demodulator 3 has a first receiver filter 51, a second receiver filter 52 and a demodulator 50. A baseband signal $a_1$ and $a_2$ is respectively supplied to the demodulator 50. That is, the first synchronous signal generated in the first section 53 is synchronized with the received signal based on the first and second baseband signal $a_1$ and $a_2$.

The first section 53 in the timing recovery section 6 has a first multiplier 54, a second multiplier 55, an adder 56, a band pass filter 57, a loop filter 58 and a voltage control oscillator 59. The first multiplier 54 squares the first baseband signal $a_1$. The second multiplier 55 squares the second baseband signal $a_2$. The adder 56 adds output signals of the first and second multipliers 54 and 55 and outputs $(a_1^2 + a_2^2)$. The band pass filter 57 extracts components having predetermined frequencies from the signal $(a_1^2 + a_2^2)$ output from the adder 56. Then the loop filter 58 and the voltage control oscillator 59 generate a synchronous signal based on the output signal of the band pass filter 57.

The present invention is not limited to the aforementioned embodiments, and variations and modifications may be made without departing from the scope of the claimed invention.

What is claimed is:

1. A control unit for controlling a modem used in a receiver which demodulates a received signal by use of adaptive equalizer means for equalizing the received signal, timing recovery means for generating a synchronous signal based on the received signal, and carrier recovery means for presuming a phase of a carrier in the received signal, states regarding operations in said adaptive equalizer means, said timing recovery means, and said carrier recovery means being updated based on the received signal, said control unit comprising:

determination means for determining whether or not said modem unusually operates based on a signal processed in said modem;

storage means, coupled to said determination means, for storing state data at a predetermined timing when said determination means determines that the modem is not operating unusually, the state data representing states regarding operations in said modem; and control means, coupled to said determination means and said storage means, for controlling at least one of said adaptive equalizer means, said timing recovery means and said carrier recovery means so that said at least one of said adaptive equalizer means, said timing recovery means and said carrier recovery means operate based on the state data which has been stored in said storage means when said determination means determines that said modem is operating unusually.

2. The control unit as claimed in claim 1, wherein said determination means has first means for calculating one or a plurality of evaluation parameters based on the signal processed in said modem, each of the evaluation parameters representing a degree of unusualness in said modem, and second means for determining whether or not at least one of the evaluation parameters is greater than or equal to a threshold value, and wherein when said second means determines that at least one of the evaluation parameters is greater than or equal to the threshold value, said determination means determines that the modem is operating unusually.

3. The control unit as claimed in claim 1, wherein said storage means has second storage means for storing the state data when a training sequence process is completed and first storage means for storing the state data at a predetermined timing while a communication procedure is being carried out after the training sequence process is completed, and wherein said at least one of said adaptive equalizer means, said timing recovery means and said carrier recovery means operates based on the state data which has been stored either in said first or second storage means when said determination means determines that said modem is operating unusually.

4. The control unit as claimed in claim 3, wherein said control means has first control means for supplying the state data which has been stored in said first storage means to said at least one of said adaptive equalizer means, said timing recovery means, and said carrier recovery means, second control means for supplying the state data which has been stored in said second storage means to said at least one of said adaptive equalizer means, said timing recovery means, and said carrier recovery means in a case where the determination means determines that the modem is operating unusually after said first control means is continuously activated for a predetermined time.

5. The control unit as claimed in claim 4, wherein said determination means is activated by a predetermined period, said second control means has counter means for counting a number of times that said determination means determines that said modem is operating unusually while said first control means is being activated, and wherein when a count value in said counter means reaches a predetermined value, said second control means is activated.

6. The control unit as claimed in claim 2, wherein said calculation means calculates one or a plurality of evaluation values based on signals input to and/or output from said adaptive equalizer means.

7. The control unit as claimed in claim 2, wherein said equalizer means includes a transversal type finite impulse response filter.

8. The control unit as claimed in claim 7, wherein the evaluation parameters include a parameter which is obtained based on a mean square value of errors, which is generated when coefficients in the transversal type finite impulse response filter are changed, in a predetermined period of time.

9. The control unit as claimed in claim 7, wherein the evaluation parameters include a first parameter which is obtained based on a mean square value of errors, which is generated when coefficients in the transversal type finite impulse response filter are changed, in a predetermined time, and a second parameter which is calculated based on a difference between a coefficient of a center tap in said transversal type finite impulse response filter and the next tap therein.

10. The control unit as claimed in claim 1, wherein said control means has third control means for controlling at least one of said adaptive equalizer means, said timing recovery means and said carrier recovery means so that said at least one of said adaptive equalizer means, said timing recovery means and said carrier recovery means operates starting from a initial state corresponding to the state data which has been stored in said storage means when said determination means initially determines that said modem is operating unusually, and refresh means for reactivating said third control means when said determination means determines that said modem is is operating unusually after said adaptive equalizer means, said timing recovery means and said carrier recovery means operate with respect to a predetermined amount of the received signal.

11. The control unit as claimed in claim 10, wherein said refresh means has a counter means for periodically incrementing and for starting from a time when said third control means is activated, said refresh means reactivating said third control means when a count value in said counter means reaches a predetermined value before said determination means determines that said modem is not operating unusually.

12. A control unit for controlling a modem used in a receiver which demodulates a received signal by use of an adaptive equalizer means for equalizing the received signal, timing recovery means for generating a synchronous signal based on the received signal, and carrier recovery means for presuming a phase of a carrier in the received signal, states regarding operations in said adaptive equalizer means, said timing recovery means, and said carrier recovery means being updated based on the received signal, said control unit comprising:
  determination means for determining whether or not said modem is operating unusually based on a signal processed in said modem;
  wherein said timing recovery means comprises:
  first means for generating a first synchronous signal based on the received signal;
  second means for generating a second synchronous signal which is synchronized with said first synchronous signal at a predetermined timing, a frequency of said second synchronous signal being maintained at a frequency which is obtained when said second synchronous signal is synchronized with said first synchronous signal; and
  control means for controlling said first means and said second means so that a synchronous signal used in said modem is switched from said first synchronous signal to said second synchronous signal when said determination means determines that said modem is operating unusually.

13. The control unit as claimed in claim 12, wherein said second means generates said second synchronous signal which is synchronized with said first synchronous signal under a condition where said modem is in a predetermined steady state after a training sequence process is completed.

14. The control unit as claimed in claim 12, wherein second means updates said second synchronous signal based on said first synchronous signal when said modem is in the steady state.

15. The control unit as claimed in claim 12, wherein said second means has a voltage control oscillator which operates at a self-running frequency, a comparator for comparing a first phase of said first synchronous signal with a second phase of a signal output from said voltage control oscillator and for outputting control signal corresponding to a difference between the first phase and the second phase, said voltage control oscillator operating based on the control signal so that the self-running frequency becomes equal to a frequency of said first frequency.

* * * * *